Aug. 5, 1924.

A. COL 1,503,636

THICKNESS INDICATOR FOR WOODWORKING MACHINES

Filed Dec. 28, 1921

Inventor:

Albert Col

By Lawrence Langner
Attorney

Patented Aug. 5, 1924.

1,503,636

UNITED STATES PATENT OFFICE.

ALBERT COL, OF PARIS, FRANCE, ASSIGNOR TO SOCIETE MARQCOL, OF MOULINS (ALLIER), FRANCE, A CORPORATION OF FRANCE.

THICKNESS INDICATOR FOR WOODWORKING MACHINES.

Application filed December 28, 1921. Serial No. 525,398.

*To all whom it may concern:*

Be it known that I, ALBERT COL, citizen of the French Republic, residing in Paris, France, 15 Rue d'Argenson, have invented a new and useful Thickness Indicator for Woodworking Machines; and I do hereby declare the following to be a full, clear, and exact description of the same.

The present invention relates to a thickness indicator for wood-working machines, comprising essentially a drum provided with peripheral graduations arranged in a helix and adapted to revolve around its axis while moving along this axis, in front of a stationary but adjustable reading mark.

The annexed drawings represent by way of example, diagrammatically and in vertical axial section respectively, the indicating device according to the invention, mounted upon a frame constituted by one of the arms of a work-guide formed by a jointed parallelogram.

Figure 1:
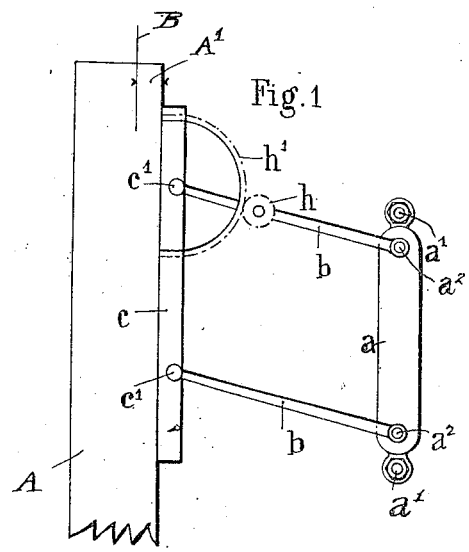
Figure 1 is the diagrammatic plan of the guide and the indicating device.
Figure 2:
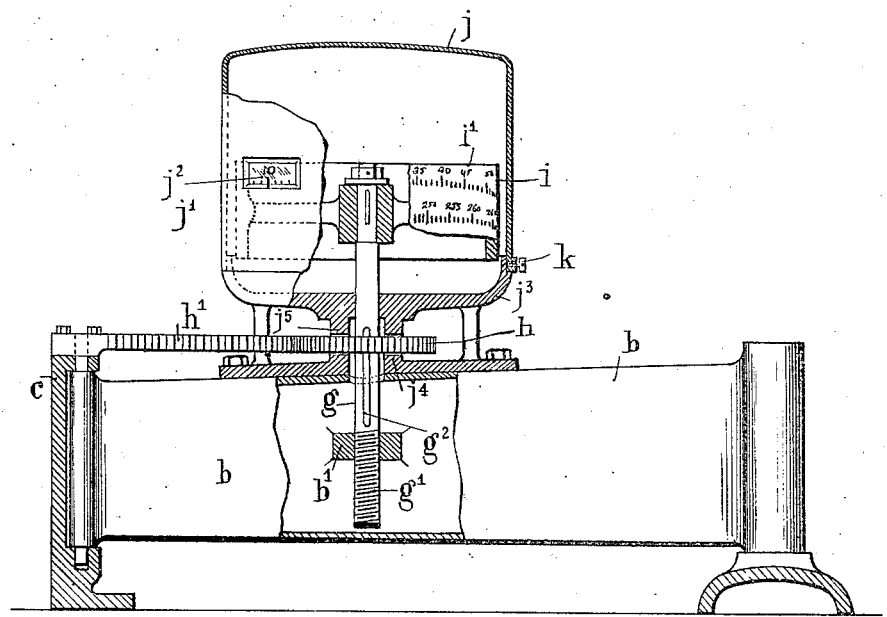
Figure 2 is the elevation, on a larger scale and partly in section, of the indicating device.

The guide, represented in Fig. 1 in combination with the indicating device of the invention, consists of a base $a$, fixed to the bed of the tool-machine by means of bolts $a^1$, of two arms $b\ b$, rotatably carried on vertical axes $a^2$, fixed to said base $a$, and of a rule $c$ pivoted to the ends of the arms $b\ b$.

The indicating device is carried by one of the arms $b$ which is provided internally with a boss provided with screw-threaded bore forming a nut $b^1$. This nut engages the screw-threads $g^1$ of a spindle $g$, at the upper end of which is mounted a drum $i$; upon the lateral surface of this drum $i$ there is inscribed along a helix a scale $i^1$ graduated in suitable units of length for example. Upon the spindle $g$ there is slidably keyed upon a feather $g^2$ a pinion $h$ meshing with a toothed sector $h^1$ secured upon the rule $c$; the pinion $h$ is prevented from following the longitudinal movements of the spindle $g$ by stops $j^4\ j^5$ provided upon the support $j^3$.

Upon this support $j^3$ there is revolubly mounted a bell $j$ completely enclosing the drum $i$ and provided with a window $j^2$ one edge of which carries the reading mark or index $j^1$. A set-screw $k$ enables the bell $j$ to be held fast in relation to its support in any desired angular position; this arrangement allows the adjustment to zero of the indicating device to be effected with accuracy.

In using the device, the piece A, to be worked on, is placed against the rule $c$, of the articulated parallelogram, and the piece A is fed to the tool B, such for example, as a saw. The thickness $A^1$ of the piece to be cut by the saw B, varies as the parallelogram $a\ b\ c\ d$ is deformed, due to placing the rule $c$ parallel to the work and to the base $a$. During this deformation of the parallelogram, the variation of the arms $b$ with respect to the rule $c$ cause rotation of pinion $h$, on the toothed sector $h'$, rotating by its movement the spindle $g$ which carries the drum $i$; since this spindle $g$ is in engagement at its screw-threaded lower portion with the nut $b^1$ fixed upon the arm $b$, this spindle and the drum integral therewith execute in addition to a rotary movement around their axis, a movement of translation along this axis, in such a way that the helical graduations $i^1$ move in front of the reading mark $j^1$.

The scale $1^1$ of the drum is graduated so as to indicate, usually in units of length, the thickness $A^1$ of the piece A, cut by the saw B, (Fig. 1).

This indicating apparatus presents the advantage of being simple and robust, inasmuch as the movable parts are very few in number and protected moreover by stationary parts wholly enclosing the said movable parts.

Having thus described my invention, what I claim is:—

1. A thickness indicating device for a work guide in wood-working machine-tools, comprising, a base fixed to the bed of the machine-tool, parallel arms pivotally connected to the ends of said base, a rule pivotally connected to the ends of said arms and parallel to the base, whereby to form an articulated parallelogram, the said rule being adapted to be engaged by the piece to be worked on, in combination with a nut secured to one of the said arms, screw-threaded spindle engaging said nut, a helically graduated drum secured upon said spindle, a casing carried by said arm and enclosing said drum, an index mark provided upon said casing and before which the graduations on said drum are movable, and means for transmitting the angular movements of the rule relatively to said arms into rotary and longitudinal movements of said spindle, for the purpose described.

2. A thickness indicating device for the work guide in wood-working machine-tools, comprising, a base fixed to the bed of the machine-tool, parallel arms pivotally connected to the ends of said base, a rule pivotally connected to the ends of said arms, and parallel to the base, whereby to form an articulated parallelogram, the said rule being adapted to be engaged by the piece to be worked on, in combination with a nut, secured to one of the said arms, a screw-threaded spindle engaging said nut, a helically graduated drum secured upon said spindle, a casing carried by said arm and enclosing said drum, an index mark provided upon said casing and before which the graduations on said drum are movable, a toothed sector secured upon the rule, and a pinion, slidably keyed upon the spindle, carrying the drum and meshing with the said toothed sector, for the purpose described.

3. In an indicating device according to claim 1, a support secured to the arm of the work guide carrying the said drum, said casing being mounted for rotation upon said support relative to the drum, and means for preventing relative motion between the casing and support, for the purpose described.

In testimony whereof I have signed my name to this specification in the presence of two subscribing witnesses.

ALBERT COL.

Witnesses:
A. ARMENGAUD, Aîné,
P. ARMENGAUD.